(12) United States Patent
Nagaoka

(10) Patent No.: US 6,221,320 B1
(45) Date of Patent: *Apr. 24, 2001

(54) DEVICE AND METHOD FOR HOLDING CATALYST IN A RADIAL FLOW REACTOR

(75) Inventor: Tadayoshi Nagaoka, Osaka-fu (JP)

(73) Assignee: Nagaoka International Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/147,086

(22) Filed: Nov. 3, 1993

Related U.S. Application Data

(63) Continuation of application No. 07/769,061, filed on Sep. 30, 1991, now abandoned.

(30) Foreign Application Priority Data

Oct. 3, 1990 (JP) .................................................. 2-265987

(51) Int. Cl.[7] ................................. B01J 8/02; B01J 35/02
(52) U.S. Cl. ........................... 422/218; 422/181; 422/192
(58) Field of Search .................................... 422/171, 180, 422/192, 219, 222, 181, 218; 55/387, 390

(56) References Cited

U.S. PATENT DOCUMENTS

| | | | |
|---|---|---|---|
| 1,590,266 | * | 6/1926 | Tiedtke et al. ............................. 55/182 |
| 3,101,778 | * | 8/1963 | Hazzard et al. ........................... 165/10 |
| 3,201,921 | * | 8/1965 | Heyes ........................................ 55/56 |
| 3,246,961 | * | 4/1966 | Karlsson ................................. 422/192 |
| 3,380,810 | * | 4/1968 | Hamblin ................................. 422/181 |
| 4,225,562 | * | 9/1980 | Anderson ............................... 422/188 |
| 4,251,487 | * | 2/1981 | Goedicke ................................ 422/179 |
| 4,385,031 | * | 5/1983 | Fratzer et al. .......................... 422/176 |
| 4,879,099 | * | 11/1989 | Koike ..................................... 422/177 |
| 4,896,704 | * | 1/1990 | Aly et al. ................................. 141/9 |

FOREIGN PATENT DOCUMENTS

| | | | |
|---|---|---|---|
| 520907 | * | 1/1956 | (CA) ..................................... 422/212 |
| 2016614 | | 10/1971 | (DE) . |
| 090132 | * | 8/1974 | (JP) ....................................... 422/177 |

* cited by examiner

*Primary Examiner*—Hien Tran
(74) *Attorney, Agent, or Firm*—Hedman & Costigan, P.C.

(57) ABSTRACT

A device for holding catalyst in a radial flow reactor includes a plurality of catalyst containers each of which is a segment of a cylinder divided in the axial plane thereof. Each catalyst container has a cross section of a size which enables the container to be carried in and out of the radial fow reactor through an opening formed in an upper or lower portion of the radial flow reactor, and includes a screen provided on a liquid inlet side and a screen provided on a liquid outlet side. The catalyst containers are assembled together to form a cylindrical catalyst bed in the radial flow reactor. The catalyst containers attains a uniform thickness of a catalyst bed in a radial direction between its inlet side and outlet side over the entire height of the cylindrical catalyst bed. One or more catalyst containers requiring checking or repair only can be taken out of the reactor.

6 Claims, 9 Drawing Sheets

DEVICE AND METHOD FOR HOLDING CATALYST IN A RADIAL FLOW REACTOR

This is a continuation of 07/769,061, filed Sep. 30, 1991 and now is abandoned.

Background of the Invention

This invention relates to a device and method for holding catalyst in a radial flow reactor used as a reforming reactor in a petroleum refinery, an ammonium synthesis apparatus in an ammonium production plant or the like.

As a reforming reactor in a petroleum refinery plant or an ammonium synthesis apparatus in an ammonium production plant, a radial flow reactor is a suitable reactor for its high efficiency of contact between fluid and granular catalyst. A radial flow reactor is, as is well known, a reactor in which the materials being processed flow radially inward through a catalyst bed and into a chamber communicating with an outlet conduit and this catalyst bed is formed in a generally vertically erected cylindrical configuration. For building a radial flow reactor, therefore, it is necessary to form a vertically erected cylindrical catalyst bed. For forming such cylindrical catalyst bed, there are two conventional methods as will be described below.

One of the conventional methods of forming a cylindrical catalyst bed relies on employment of a center pipe screen a and scallop screens b as shown in FIG. 10.

As the scallop screens b, slitted plates of a relatively small thickness are used for necessity of forming a large number of slits c and for facility of processing and these screens b are formed in a scallop shape for preventing deformation or collapse. Since the scallop screens b are not strong enough to stand pressure of catalyst filled in the catalyst bed by themselves, these scallop screens b are disposed along the inner wall of a reactor d.

The center pipe screen a is erected in the center of the reactor d in a self-supporting manner. Since the center pipe screen a which is subject to a strong catalyst pressure is made of wire netting or a perforated plate and has not sufficient strength to stand the catalyst pressure, a perforated pipe e of a large thickness is provided inside of the center pipe screen a for reinforcing it. These scallop screens b and the center pipe screen a are installed independently from each other by separate installation work and upon completion of the respective screens a and b, catalyst is filled in an annulus formed between the center pipe screen a and the scallop screens b and, as a result, a vertically erected cylindrical catalyst bed is formed. In using the radial flow reactor, fluid is generally supplied from an inlet f located in the upper portion of the reactor d. The fluid then enters the cylindrical catalyst bed from the scallop screens b for a predetermined catalytic reaction and then is collected in the center pipe screen a and led to an outlet provided in the lower portion of the reactor d.

Conversely, fluid may be introduced from the center pipe screen a and collected from the scallop screen b and led to the outside of the reactor. Likewise, the inlet for fluid may be provided in the lower portion of the reactor and the outlet in the upper portion of the reactor.

The other method for forming a cylindrical catalyst bed in a radial flow reactor employs, as shown in FIG. 11, an inner cylindrical screen g and an outer cylindrical screen h.

The inner cylindrical screen g is of a similar construction to the center pipe screen a of FIG. 10 and and is installed in substantially the same way as the center pipe screen a.

The outer cylindrical screen h is, as is different from the scallop screens b of FIG. 10, installed in a self-supporting manner and, for this purpose, has a reinforced cylindrical construction. A cylindrical catalyst bed is formed by filling catalyst in an annulus formed between the outer and inner cylindrical screens h and g.

These conventional radial flow reactors have, however, several problems which have remained unsolved to date.

First, for obtaining a catalytic reaction of a high efficiency in a radial flow reactor, time of contact of fluid with catalyst, i.e., distance of passage of fluid through catalyst, needs to be uniform. For this purpose, the catalyst bed needs to have a uniform thickness in radial direction throughout its entire height, i.e., a uniform radius in all cross sections of the cylinrical configuration.

In the radial flow reactor using the scallop screens b and the center pipe screen a shown in FIG. 10, however, the outer periphery of the cylindrical catalyst bed is defined by the shape of the scallop screens b and therefore this catalyst bed cannot inherently attain a uniform thickness in radial direction.

A catalytic reaction in a radial flow reactor is generally performed under a high temperature and a high pressure. Since the scallop screens b are disposed along the inner wall of the reactor d, a gap tends to develop between adjacent scallop screens b due to thermal expansion and contraction of the scallop screens b occurring during running and stopping of the reactor. This causes a part of catalyst to enter space between the inner wall of the reactor d and the rear side of the scallop screens b through this gap formed between the adjacent scallop screens b with a resulting loss of efficiency in the catalyst reaction.

Moreover, when the center pipe screen a which is fixed on the bottom pate of the reactor d is even slightly inclined due to an installation error, the center pipe screen a cannot have a concentric relation particularly in its upper portion with respect to the inner wall of the reactor d with the result that a uniform thickness in radial direction of the cylindrical catalyst bed cannot be obtained. Thus, it is extremely difficult in the radial flow reactor using the scallop screens b and the center pipe screen a to form a cylindrical catalyst bed having a uniform thickness in radial direction.

In the radial flow reactor using the inner cylindrical screen g and the outer cylindrical screen h, the scallop screens b are not used and, therefore, the inherent lack of uniformity in thickness of the catalyst bed in the radial flow reactor using the scallop screens b as described above does not exist. Since, however, the inner cylindrical screens g and the outer cylindrical screen h are installed independently and separately from each other, there exists in this radial flow reactor the same problem as in the radial flow reactor using the scallop screens b that a slight inclination between the inner cylindrical screen g and the outer cylindrical screen h due to an installation error leads to lack of uniformity in thickness in radial direction of the cylindrical catalyst bed. Accordingly, it is also difficult to form a cylindrical catalyst bed having a uniform thickness in radial direction by this radial flow reactor.

Aside from the above described problem of difficulty in obtaining a cylindrical catalyst bed having a uniform thickness due to the shape of the screen element and inclination of the cylindrical screens caused by an installation error, these conventional radial flow reactors have the problem that, in a case where a radial flow reactor is of relatively large dimensions, it is difficult in these reactors to attain a uniform thickness in radial direction of the cylindrical catalyst bed throughout the entire height of the vertically disposed cylindrical catalyst bed, even if there is no inclination between the scallop and center pipe screens or between the inner and outer cylindrical screens. In a radial flow reactor of a large size, the amount of catalyst used in the catalyst bed is large and pressure produced by catalyst against the cylindrical screens becomes larger in the lower portion of the catalyst bed. Since the cylindrical screens are fixed to the reactor in the top and bottom portions, they have a substantially constant thickness in radial direction in the upper and lower portion of the cylindrical catalyst bed in the vicinity of the top and bottom portions of the cylindrical screens. In the middle portion of the cylindrical catalyst bed as viewed in the direction of its height, however, the cylindrical screens tend to be bent outwardly of the catalyst bed due to pressure of the catalyst with the result that the thickness in the middle portion of the cylindrical catalyst bed becomes larger than the thickness of the cylindrical catalyst bed in the vicinity of the top and bottom plates of the cylindrical screens. This is particularly the case when a wedge wire screen which is weaker in strength than a perforated plate screen is used as the cylindrical screen. It is, therefore, difficult to attain a uniform thickness in radial direction over the entire height of the cylindrical catalyst bed.

Another problem in a radial flow reactor is that, even when the thickness of the catalyst bed is uniform, fluid does not necessarily flow straightly and strictly radially in the cylindrical catalyst bed but it sometimes flows in a direction deviated from the radial direction depending upon the condition of packing of catalyst. That is, fluid tends to flow more easily to a portion of the catalyst bed in which the catalyst is less densely packed than to a portion in which the catalyst is densly packed, thus causing a deviated flow of fluid. The distance of passage of fluid through the catalyst bed therefore tends to vary depending upon the condition of packing of the catalyst in the cylindrical catalyst bed resulting in lack of uniformity in the product of the catalytic reaction.

In a radial flow reactor, it becomes necessary after running of the reactor for a certain period of time to check a screen portion of the reactor and repair it if necessary. For such checking and repair of the screen portion, all catalyst packed in the cylindrical catalyst bed must be removed out of the reactor regardless of whether the radial flow reactor is the reactor of the type shown in FIG. 10 or the one shown in FIG. 11. After checking and repairing the screen portion, the catalyst must be filled in the cylindrical catalyst bed again. Repair of the screen portion is usually made outside of the radial flow reactor. In a case of a chemical plant, such regular check of the radial flow reactor is performed by closing all plant temporarily and so only a short period of time is allowed before running of the plant is resumed. A lot of man power therefore is required for completing such check and repair in such a short closing period of the plant. Thus, removal and refilling of all catalyst packed in the cylindrical catalyst bed not only requires a tremendous labor and cost but impair expensive catalyst and deteriorate the quality of the catalyst through the removal and refilling processes thereby adversely affecting the efficiency of the catalytic reaction.

Aside from the requirement for checking all screen portion of the reactor, there is a case where not the entire screen but only a part of the screen needs to be checked or repaired. Even in this case, all catalyst must be removed for checking or repairing the part of the screen in the conventional radial flow reactors.

For the purpose of facilitating removal of catalyst from a radial flow reactor, U.S. Pat. No. 3,758,279 discloses a radial flow reactor in which a catalyst bed is composed of a plurality of concentrically positioned cartridges each of which is closed by a bottom member and an upper member and screens made of apertured plates. In this radial flow reactor, each of the cartridges is independently removable from the reactor and catalyst can be replaced in either of the cartridges as desired.

This prior art radial flow reactor using the concentric cartridge type catalyst beds does facilitate removal of catalyst from the reactor. Even in this reactor, however, one entire annular cartrdige must be taken out of the reactor and all catalyst in the annular cartridge must be removed even in a case where only a part of the screen of the cartridge needs to be checked or repaired. Moreover, the prior art cartridge type reactor does not solve in any way the above described problems of the radial flow reactor that it is difficult to attain a uniform thickness in radial direction over the entire height of the catalyst bed due to pressure of catalyst and that the distance of passage of fluid through the catalyst bed tends to vary due to deviation of the flow of fluid from the radial direction depending upon the condition of packing of the catalyst. Further, in a case where the size of the radial flow reactor is very large, the weight of the annular cartridge containing catalyst therein is huge and it requires a crane of a tremendous power and hence it is not very realistic to use the prior art cartridge type reactor when the size of the radial flow reactor is very large.

It is, therefore, an object of the invention to provide a device for holding catalyst in a radial flow reactor which is capable of forming a cylindrical catalyst bed having a uniform thickness in radial direction over the entire height of the catalyst bed.

It is another object of the invention to provide a device for holding catalyst in a radial flow reactor which is capable of preventing deviation of flow of fluid in the catalyst bed and thereby attaining uniform distance of passage of fluid through the catalyst bed.

It is another object of the invention to provide a device for holding catalyst in a radial flow reactor which enables checking or repairing of only a part of screen portion of the radial flow reactor without removing all catalyst in the entire catalyst bed.

SUMMARY OF THE INVENTION

For achieving the above described objects of the invention, the device for holding catalyst in a radial flow reactor comprises comprising a plurality of catalyst containers each of which is a segment of a cylinder divided in the axial plane thereof, has a cross section of a size which enables the container to be carried in and out of the radial fow reactor through an opening formed in an upper or lower portion of the radial flow reactor, and comprises a first screen provided on a liquid inlet side and a second screen provided on a liquid outlet side, said plurality of catalyst containers being assembled together to form a cylindrical catalyst bed in the radial flow reactor.

According to the device of the invention, each catalyst container has a uniform thickness of a catalyst bed between the liquid inlet side and the liquid outlet side and, accordingly, this uniform thickness is not affected at all, even if a slight inclination of the catalyst container has arisen in placing it on the container seat.

Fluid supplied from an inlet provided in the upper or lower portion of the radial flow reactor enters the catalyst containers from the first screen provided on the liquid inlet side, passes through the catalyst bed of the uniform thickness substantially in a radial direction and led to an outlet of the reactor through the second screen provided on the liquid outlet side.

Since influence of thermal expansion and contraction due to repetitious starting and stopping of running of the reactor is absorbed by each catalyst container, the uniformity of thickness of the catalyst bed inside the container is hardly affected by such thermal expansion and contraction. Even if the thickness of the catalyst bed in the container after thermal expansion differs from the thickness of the catalyst bed at the initial state of running due to difference in area between the first screen and the second screen of the container, the manner of difference in the thickness of the catalyst bed is uniform because these containers have the same construction and, therefore, the thickness of the catalyst layer after thermal expansion is still uniform throughout all catalyst containers. Thus, according to the invention, a cylindrical catalyst bed of a uniform thickness can be maintained in the catalytic reactor in all cases.

Since the respective catalyst containers are completely sealed from their adjacent catalyst containers by their side plates, there hardly occurs deviation or bypassing in the flow of fluid. Fluid flows in a regular radial flow within each catalyst container restricted by the side plates from the first screen to the second screen whereby a uniform, and therefore efficient, catalytic reaction can be achieved.

The respective catalyst containers are assembled to form a cylindrical catalyst bed as a whole in the radial flow reactor. This assembled cylindrical catalyst bed which has an integral construction constitutes a strong and rugged structure which can sufficiently stand the running conditions under high temperature and high pressure. Particularly, since the cylidrical catalyst bed which was formed in a simple annular configuration in the conventional radial flow reactors and also in the radial flow reactor disclosed in U.S. Pat. No. 3,758,279 is now composed of several segements of the catayst containers in the present invention, the catalyst bed of the invention is by far superior in its strength to the catalyst beds of the conventional and prior art radial flow reactors.

The method for holding catalyst in a radial flow reactor comprises filling catalyst in each of a plurality of catalyst containers each of which is a segment of a cylinder divided in the axial plane thereof and has a cross section which enables the container to be carried in and out of the radial flow reactor through an opening formed in an upper or lower portion of the radial flow reactor, and comprises a first screen provided on a liquid inlet side and a second screen provided on a liquid outlet side; carrying the catalyst containers having been filled with catalyst into the radial flow reactor through the opening thereof and assembling the catalyst containers to form a cylindrical catalyst bed; and taking, when necessary, only one or more of the catalyst containers which require checking or repair out of the radial flow reactor through the opening of the reactor for checking or repair, retaining the rest of the catalyst containers which do not require checking or repair in the radial flow reactor.

According to the method of the invention, the troublesome work of removing all catalyst from the radial flow reactor for checking or repairing a screen portion is obviated and only one or more of the catalyst containers which are considered to require checking or repairing need to be taken out of the radial flow reactor. Checking of the screen portion per se can be carried out without removing catalyst from the catalyst container as different from the conventional method according to which catalyst must be removed for checking a screen portion. When repair of a screen in a catalyst container is necessary, catalyst of the catalyst container only is removed, repair is made and catalyst is refilled in the catalyst container. This saves labor and time for the repair of the screen as compared with the conventional method. Such checking or repair will be further facilitated and resumption of running of a plant will be expedited if one prepares for a spare catalyst container before carrying out the checking or repair and replace a catalyst container requiring checking or repair by the spare catalyst container.

In filling catalyst initially in the catalyst containers of the invention before starting running of the radial flow reactor, a relatively small amount of catalyst is filled in the catalyst container as compared with the convnetional method in which catalyst is filled in the entire annulus for a cylindrical catalyst bed. This is beneficial for catalyst life because this method of filling a small amount of catalyst is less likely to damage catalyst than in the conventional method in which catalyst is filled in bulk with the result that a part of catalyst is in a damaged condition already when it has been filled in the catalyst bed. Additionally, adjustment of density of filled catalyst is much easier than in the conventional method.

In checking or repair of a screen portion, possibility of damage to catalyst is remarkablly reduced according to the method of the invention as compared with the conventional method for the reason described above.

Thus, according to the method of the invention, not only a cylindrical catalyst bed having a uniform thickness in radial direction can be obtained but the deterioration of catalyst can be prevented and the efficiency of catalytic reaction can be improved.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
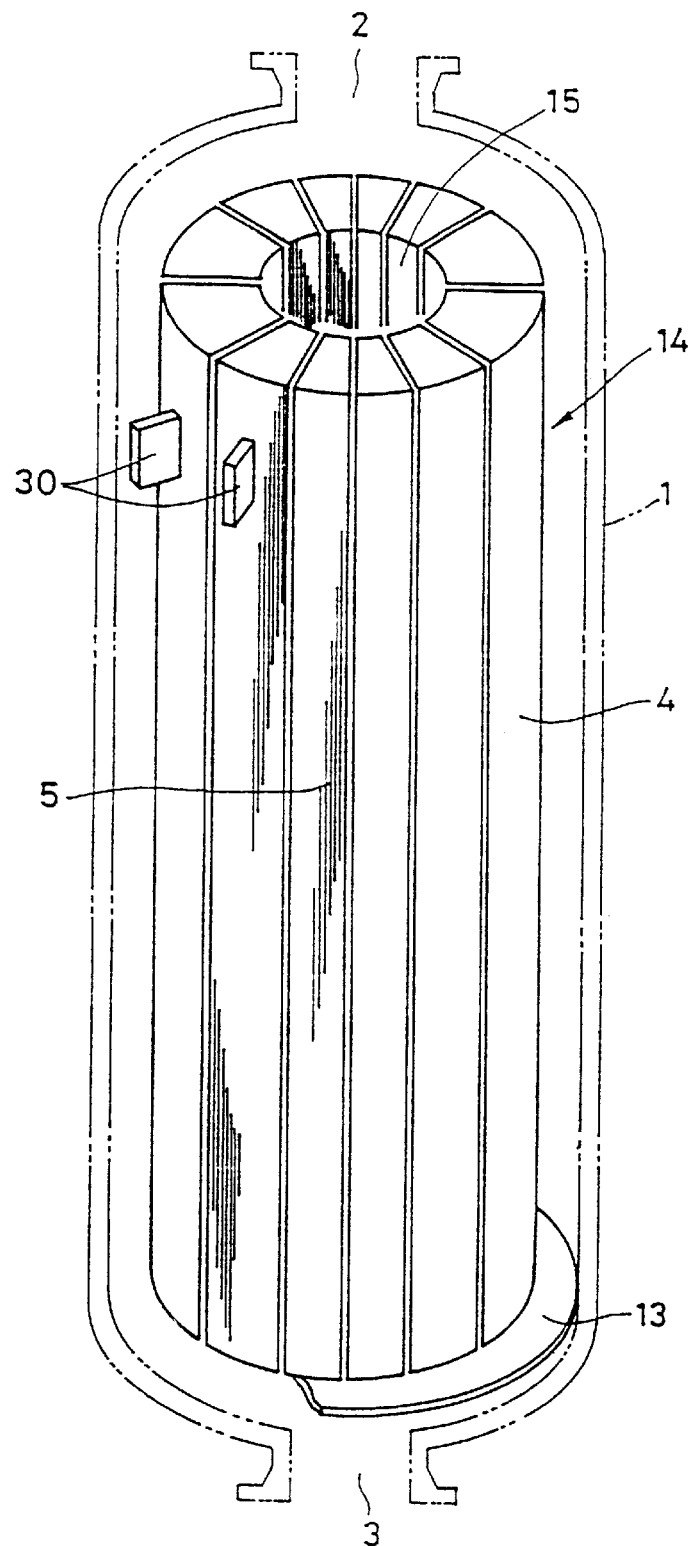
FIG. 1 is a perspective view showing an embodiment of the device for holding catalyst in a radial flow reactor according to the invention.

FIGS. 1 to 4 illustrate an embodiment of the device for holding catalyst according to the invention. FIG. 1 is a persepective view of the device schematically showing a state wherein catalyst containers are assembled cylindrically in a radial flow reactor.

A radial flow reactor 1 has an inlet 2 of liquid to perform catalytic reaction in the upper portion thereof and an outlet 3 of liquid which has finished the catalytic reaction in the lower portion thereof.

Figure 2:
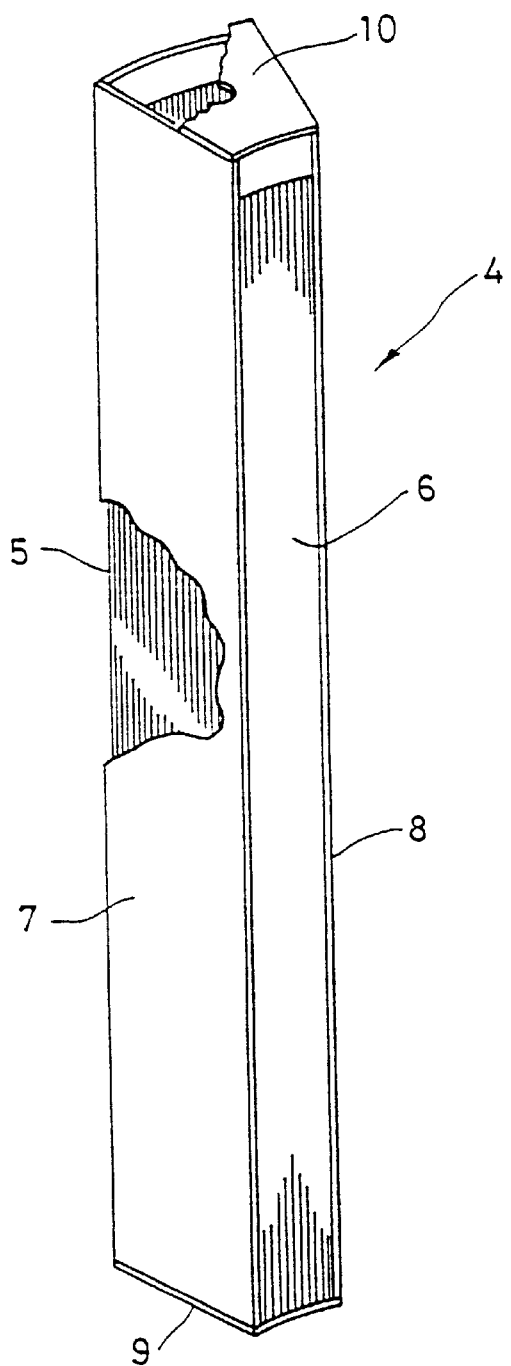
FIG. 2 is a perspective view showing an example of a catalyst container used in the device according to the invention.

A catalyst container 4 is a box-like container in a form which is obtained by dividing a cylinder in the axial direction of the cylinder to plural segment portions having a cross section of a size which enables the container to be carried into or out of the reactor 1 through the liquid inlet 2. As shown in FIG. 2, an outer screen 5 is provided on the circumferential surface of the liquid inlet side (i.e., outer circumferential surface) and an inner screen 6 is provided on the circumferential surface of the liquid outlet side (i.e., inner circumferential surface). Side plates 7 and 8 are provided on side portions of the catalyst container 4 which connect the screens 5 and 6. The bottom portion of the catalyst container 4 is closed with a bottom plate 9 and the top portion of the catalyst container 4 is closed with a lid plate 10 which can be opened after filling catalyst in the container 4. The respective screens 5 and 6 consist of wedge wires 12 extending in the vertical direction welded to horizontally extending support rods 11.

For forming a cylindrical catalyst bed by using these catalyst containers 4, each catalyst container 4 is filled with catalyst. After closing the lid plates 10, the catalyst containers 4 are carried into the catalyst reactor 1 through the liquid inlet 2 by, for example, hanging them with a crane. These containers 4 are placed at predetermined locations on a container seat 13 in such a manner that the outer screens 5 face outward and the inner screens 6 face inward. A projection may be provided in either of the container seat 13 and the bottom plate 9 of the container 4 and a corresponding depression to fit with the projection in the other of the container seat 13 and the bottom plate 9. The adjacent containers 4 are disposed without a gap therebetween so that the side plates 7 of the adjacent containers 4 are in contact with each other. By assembling the catalyst containers 4 in the radial flow reactor 1 in such a manner that the containers 4 after assembling will constitute a cylinder as a whole, a cylindrical catalyst bed 14 is formed. A reference character 30 designates spacers which hold the containers 4 with a gap between the inner wall of the radial flow reactor 1 and the outer surface of the containers 4.

Figure 4:
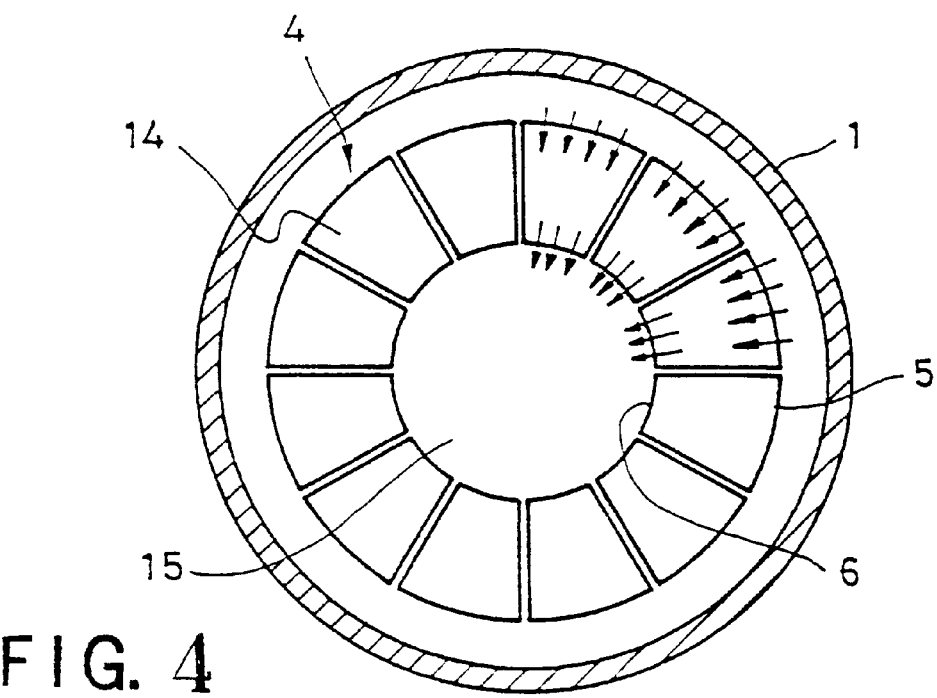
FIG. 4 is a cross sectional view of the device shown in FIG. 1.

During running of the radial flow reactor 1, liquid supplied from the liquid inlet 2 of the reactor 1 enters the containers 4, as shown in the plan view of FIG. 4, from the screen 5 of the liquid inlet side of the containers 4 which are cylindrically arranged and passes through cylindrically arranged catalyst bed 14 formed in a uniform thickness in radial direction to perform catalytic reaction with the catalyst and then enters an inner cylindrical outlet passage 15 and is led out of the liquid outlet 3 of the reactor 1.

In a case where the screens 5 and 6 need to be checked or repaired, one or more catalyst containers 4 which need check or repair are carried out of the reactor 1 by means of a crane or the like and, after conducting a necessary check or repair work, the catalyst containers 4 which have completed the check or repair work are restored to their locations in the reactor 1. The other catalyst containers 4 which do not require such check or repair are left in their original locations in the catalytic reactor 1.

Figure 5:
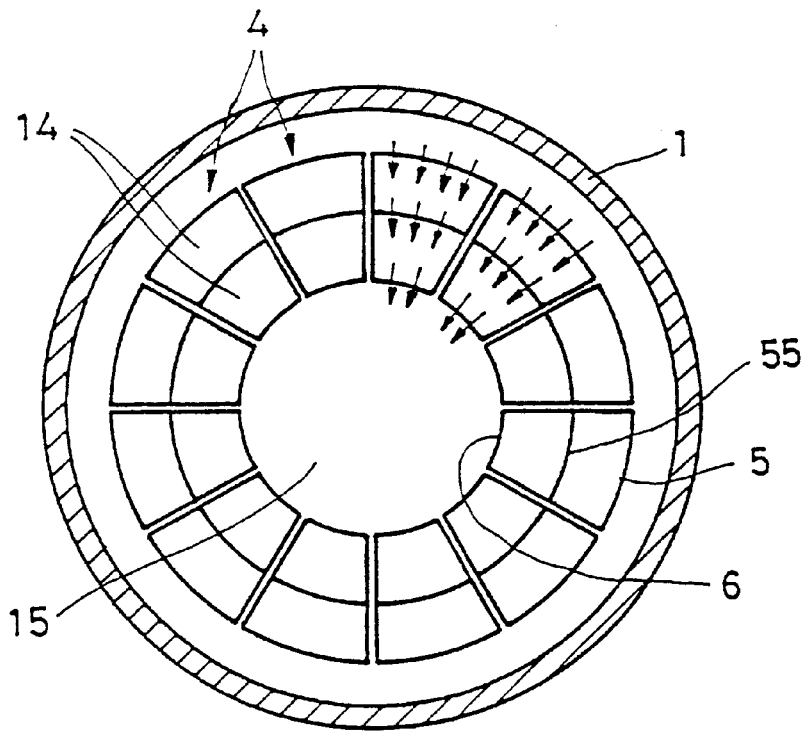
FIG. 5 is a cross sectional view of another embodiment of the invention.

In the above described embodiment, the catalytic containers 4 are arranged cylindrically in one layer in the radial direction to form the cylindrical catalyst bed 14. Alternatively, the catalyst containers 4 may be arranged in two layers in the radial direction as shown in FIG. 5 by providing additional screens 55. The catalyst containers 4 may also be arranged in three or more layers in the radial direction.

Figure 3:
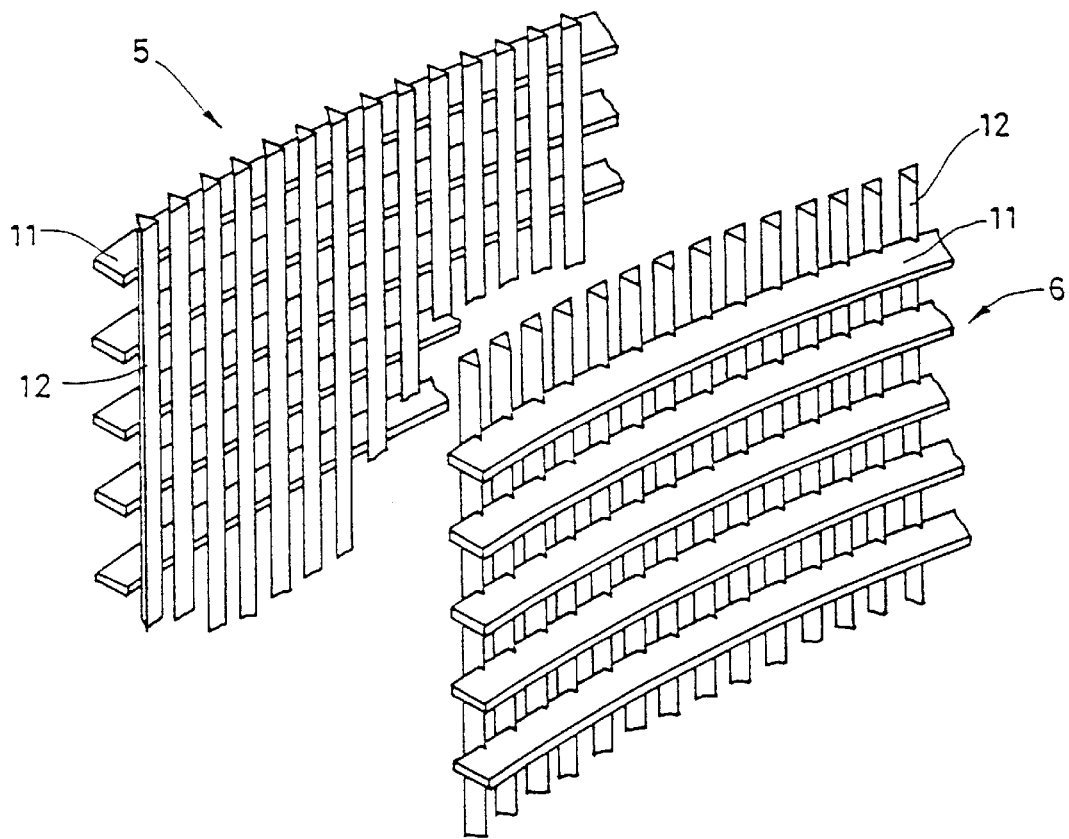
FIG. 3 is a partial perspective view showing an example of screens 5 and 6 used in the catalyst container of FIG. 2.
Figure 6:
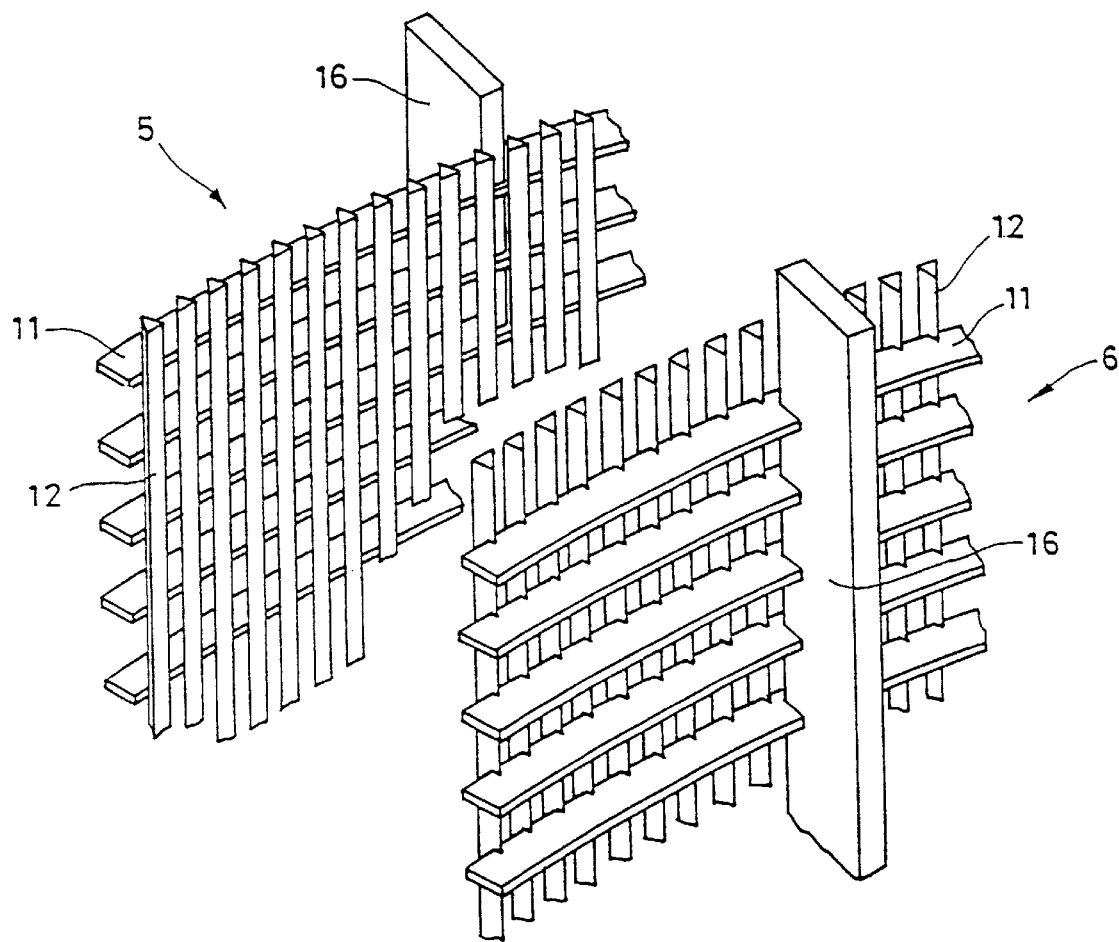
FIG. 6 is a partial perspectiv view of another example of screens 5 and 6 used in the catalyst container.

The structure of the screens 5 and 6 is not limited to the one shown in FIG. 3 but, as shown in FIG. 6, vertical reinforcing members 16 may be provided at proper locations in the screens 5 and 6. The wire 12 of the screens 5 and 6 need not necessarily be a wedge wire as shown but a wire of other cross section such as a square or circular cross section may be used as well. As the screens 5 and 6, not only a wire type screen but a screen selected from other types of screens made of a perforated or slitted plate, wire netting etc. may be used depending upon the situation in which the radial flow reactor is used.

Figure 7:
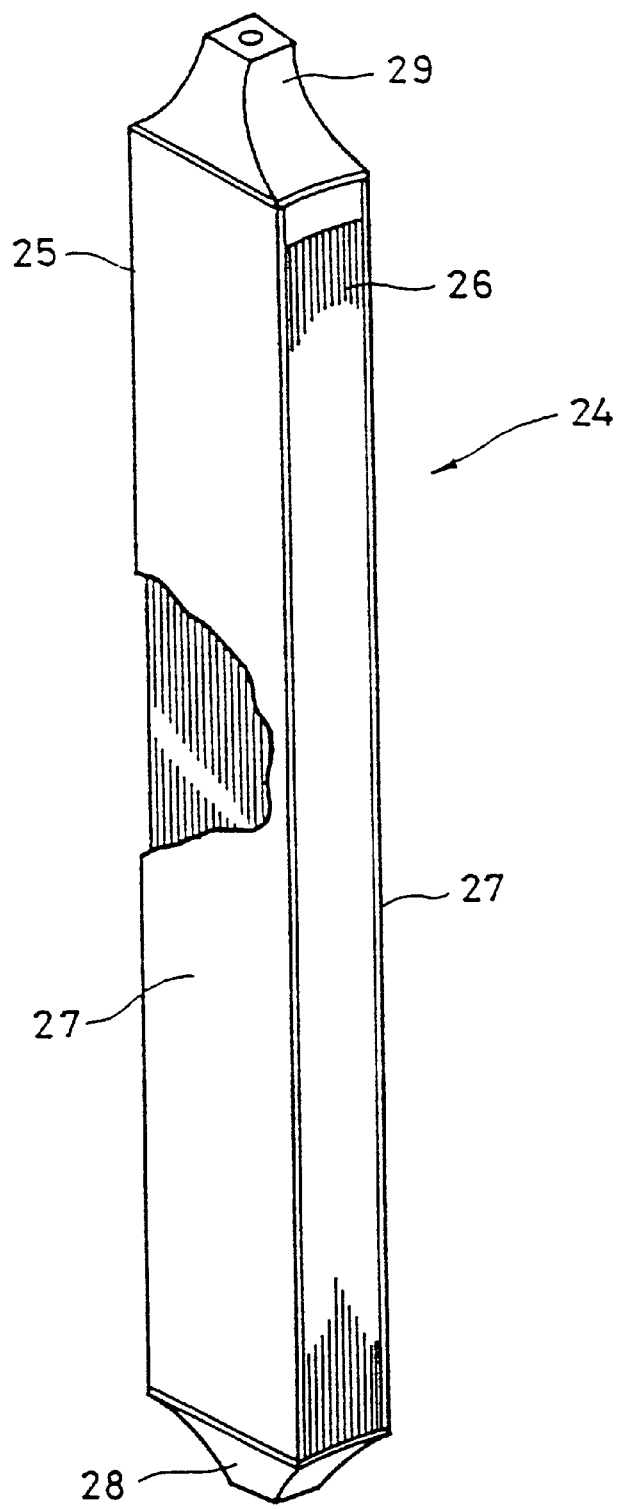
FIG. 7 is a perspective view showing another example of the catalyst container.

The catalyst containers 4 of the above embodiment are used for a stationary catalyst bed. The invention is applicable also to a radial flow reactor of a moving catalyst bed type. Since catalyst moves constantly from a catalyst inlet to a catalyst outlet, a catalyst container adapted to the moving catalyst bed needs to have a structure which enables such movement of catalyst. FIG. 7 shows an example of a catalyst container having such construction adapted to the moving catalyst bed. A catalyst container 24 has, in the same manner as the catalyst container 4 of FIG. 2, an outer screen 25, an inner screen 26 and side plates 27, 27. The catalyst container 24 is formed in the bottom portion thereof with a funnel shaped catalyst outlet 28 and in the top portion thereof with a funnel shaped catalyst inlet 29. In the same manner as in the above described embodiment of the stationary catalyst bed type radial flow reactor, the catalyst containers 24 are assembled to a cylindrical catalyst bed. In the moving catalyst bed, catalyst gradually enters the catalyst container 24 through a pipe (not shown) connected to the catalyst inlet 29, moves downward in the catalyst container 24 and is removed outside from the catalyst outlet 28. New catalyst is always supplied into the catalyst container 24 from the catalyst inlet 29.

Figure 8:
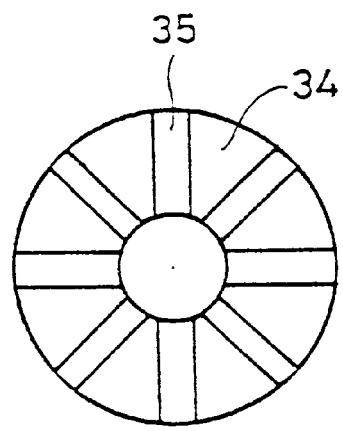
FIG. 8 is a modified example of arrangement of the catalyst containers.

In the above described embodiments, the catalyst containers 4 or 24 which are of the same cross sectional shape are cylindrically arranged. Alternatively, as shown in FIG. 8, catalyst containers 34 and 35 having cross sectional shapes which are different from each other may be arranged in combination to form a cylindrical catalyst bed.

In the above described embodiments, the catalyst containers are so constructed that a completely radial flow path of fluid is formed in the catalyst bed. The invention is not limited to this but other type of flow path such as an oblique flow path with respect to the radial direction of the cylindrical catalyst bed may be employed if it can maintain a substantially uniform distance of passage of fluid flow.

Figures 9A, 9B:
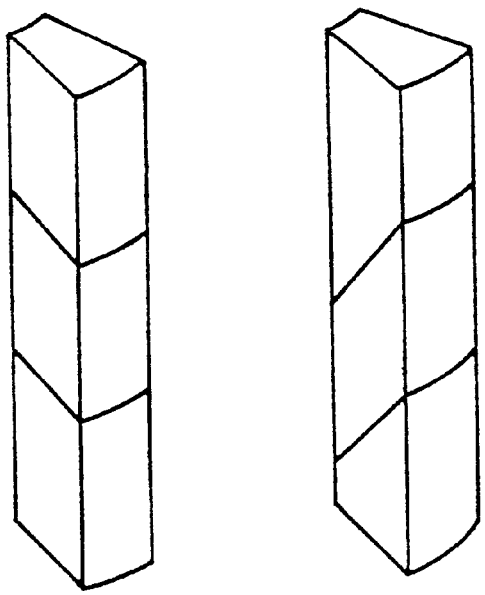
FIGS. 9A and 9B are schematic views showing modified examples of the catalyst container.
Figure 10:
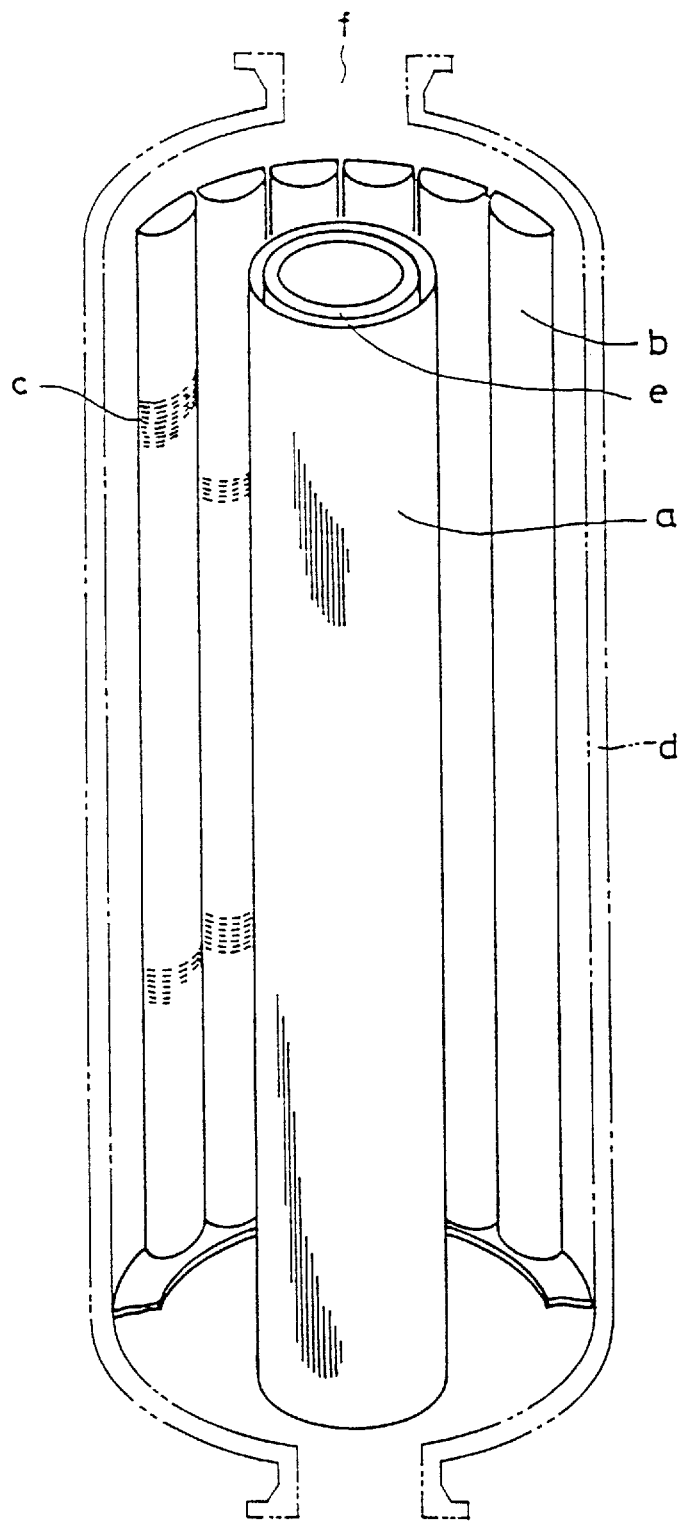
FIGS. 10 and 11 are perspective views showing the prior art devices for holding catalyst in a radial flow reactor.
Figure 11:
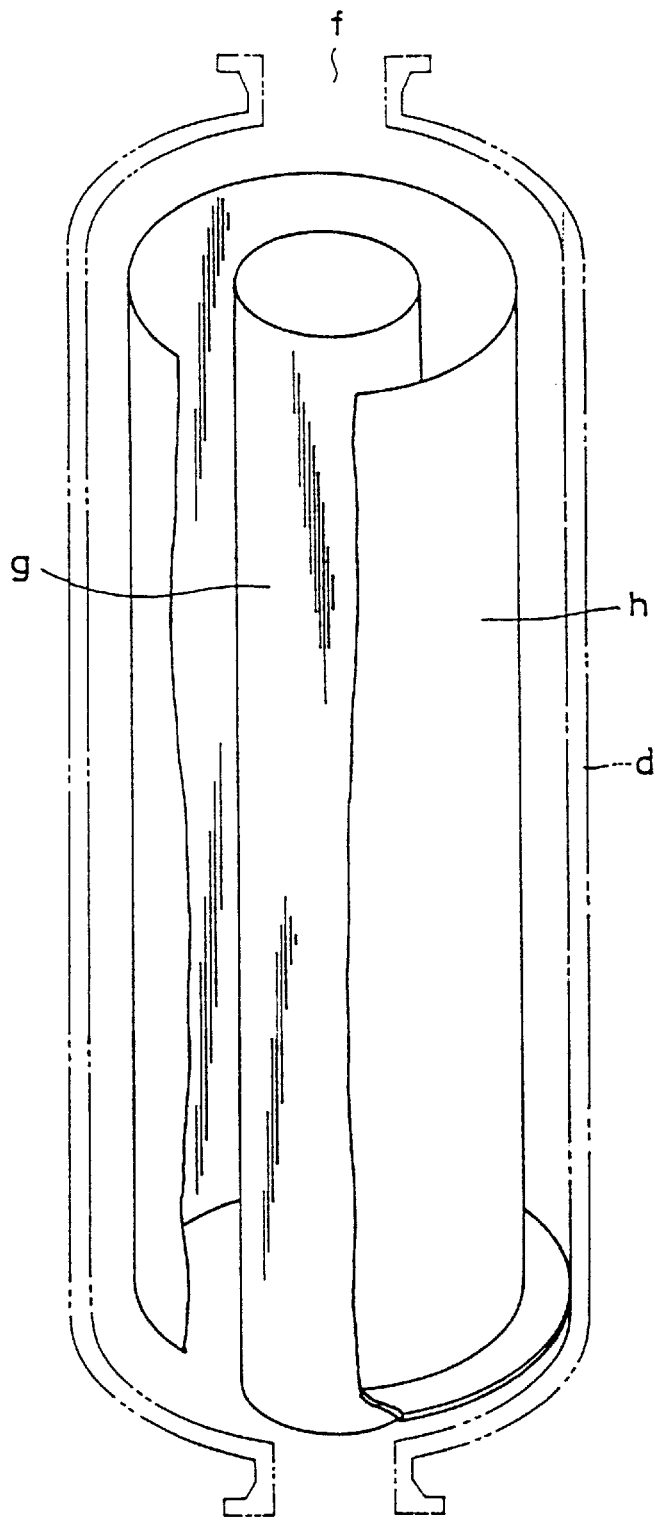

In the above described embodiments, each of the catalyst containers 4 and 24 is made of a single oblong box-like body. Alternatively, a catalyst container may be divided in plural sections in the longitudinal direction by a substantially horizontal plane or inclined plane as shown in FIGS. 9A or 9B. By the arrangement of FIGS. 9A or 9B, carrying of the catalyst container in or out of the radial flow reactor can be facilitated. In the above described embodiments, the catalyst containers are carried in and out of the reactor 1 through the upper inlet 2. The catalyst container may also be carried in and out of the reactor 1 through a man hole (not shown) formed in the lower portion of the reactor 1.

In the above described embodiments, the catalytic container 4 or 24 has side plates 7, 8 or 27, 21 provided in the side portions of the container 4 or 24. This structure is particularly preferably because this structure is very effective for regulating the flow of fluid from the outer screen 5 or 25 to the inner screen 6 or 26 to a regular radial flow without deviation. However, it is possible, if necessary, to provide a screen in a part of all of one or both of the side plates 7, 7 or 27.

Instead of forming the entire outer or circumferential surface of the catalyst container with a screen, only a part of the outer or inner circumferential surface may be formed with a screen so as to extend the distance of passage of fluid in the catalyst bed.

In the above described embodiment, the inlet for fluid is provided in the upper portion of the reactor and the outlet for fluid in the lower portion of the reactor. Conversely, the inlet for fluid may be provided in the lower portion of the reactor and the outlet in the upper portion of the reactor. Also, conversely to the above described embodiment, the fluid may be caused to flow into the catalyst container 4 from the inner circumferential surface and flow out of the outer circumferential surface.

What is claimed is:

1. A device for holding catalyst in a vertical radial flow reactor, said device comprising a plurality of vertically arranged independent and free standing catalyst containers, said catalyst containers having the shape of a single elongated segment of a cylinder divided by two planes which are passed through an axis of the cylinder, said catalyst containers having a length and a cross section of a size which enables said catalyst containers to be individually inserted and removed, without removing the other catalyst containers from the vertical radial flow reactor, said catalyst containers being removable through an opening formed in an upper or lower portion of the vertical radial flow reactor, said catalyst containers for holding catalyst in the vertical radial flow reactor having a liquid inlet side on said catalyst container comprising a first screen on said liquid inlet side, said first screen being shaped as an arc of a circle which is coaxial with the vertical radial flow reactor, a liquid outlet side on said catalyst container comprising a second screen on said liquid outlet side, said second screen being shaped as a segment of an arc of a circle which is coaxial with the vertical radial flow reactor, side walls which are imperforate, a bottom plate and a lid plate, said plurality of catalyst containers being assembled together to form a cylindrical catalyst bed in said vertical radial flow reactor.

2. A device for holding a catalyst in a radial flow reactor as defined in claim 1, wherein each of said catalyst containers which is a segment of a cylinder formed by two planes which are passed through the axis of the cylinder is held in spaced arrangement from an inner wall of the radial flow reactor by means of a spacer.

3. A device for holding a catalyst in a radial flow reactor as defined in claim 2, wherein said liquid inlet side of said catalyst container is adjacent to said inner wall of the radial flow reactor.

4. A device for holding a catalyst in a radial flow reactor as defined in claim 1 wherein said catalyst container has the closed bottom plate and the closed lid plate.

5. A device for holding a catalyst in a radial flow reactor as defined in claim 1 wherein said catalyst containers are arranged in a single layer in a radial cross-section of the cylindrical catalyst bed.

6. A device for holding a catalyst in a radial flow reactor as defined in claim 1 wherein said catalyst containers are arranged in plural layers in a radial cross-section of the cylindrical catalyst bed.

\* \* \* \* \*